April 21, 1936.  W. P. KLIMENT  2,038,116
TOOL
Filed July 20, 1934
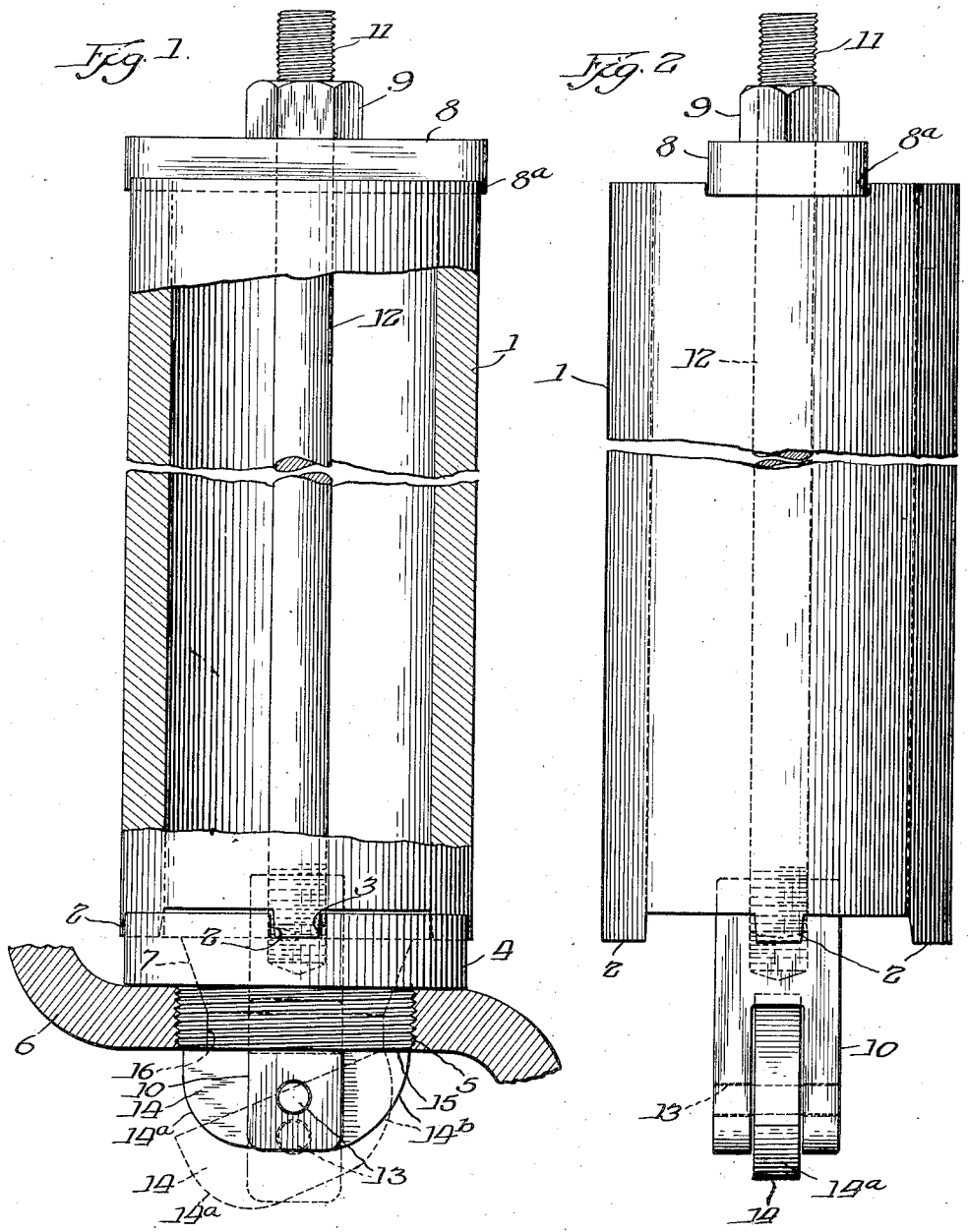
Witness:
R. B. Davison
Inventor:
William P. Kliment
By Joseph O. Lange
Atty Patented Apr. 21, 1936

2,038,116

UNITED STATES PATENT OFFICE 2,038,116

TOOL

William P. Kliment, Chicago, Ill., assignor to Crane Co., Chicago, Ill., a corporation of Illinois Application July 20, 1934, Serial No. 736,244

1 Claim. (Cl. 81—90)

It has long been a serious problem to properly provide for the convenient and positive removability of body seat rings in globe and angle valves especially where the latter have been installed on lines involving high temperatures and/or corrosive conditions inducing knitting of metals. The body seat rings in actual use frequently "freeze" to the casing or body seat and for this reason are practically irremovable by ordinary means usually available. Or in many instances removability is accomplished only after the body ring lugs have been badly marred by the great amount of wrench effort required to loosen or remove the seat rings. Then also, frequently the tools have had a tendency to slip or break under the great strain required with resultant injury to the operator.

This invention, therefore, relates particularly to such device which is suitable for quick, convenient and safe removal of body seat rings from valves or similar devices.

More specifically, this invention has for its object a means for providing simple manual operation capable of permitting excessive power by a single individual.

Another important object is to provide for a tool which is capable of being rigidly and positively attached to a body seat ring, thus forming a solid unit with adequate support.

Another object is to prevent or avoid the canting, tipping, or slippage previously present in tools of this character.

Another important object is to provide a tool having great strength and ruggedness inherently in its design so that if necessary an additional lever such as a pipe wrench, can easily be applied without sacrifice of quick assembly and disassembly, or without injury to the operator due to slippage or failure due to breakage.

Other advantages will become apparent after reading the specification, in which

Fig. 1 is a front partially sectional view showing the application of the tool to a body seat ring prior to removal thereof from the valve body or casing.

Fig. 2 is a side external view showing the assembled tool.

Directing attention to Fig. 1, a length of pipe 1 is selected of the proper diameter height, and is provided with lugs 2 to engage complementary slots 3 of the body seat ring 4, the latter as shown by means of the threads 5, being attached to the bridge wall or diaphragm 6 of a valve (not shown) and which by means of its tapered face 7 provides a seat for a valve closure member (not shown).

Suspended from a crosshead 8 supported against one end of the pipe within a slot 8a and preferably threadedly connected to the said crosshead by means of the nut 9 and the threads 11, a stem or rod 12 extends downwardly along the vertical axis of the pipe and having attached at its lower end by means of the pin 13 a pivotally mounted span member 14, which by reason of being pivoted slightly off center so that the portion 14a normally is tipped lowermost, has a sufficient width so as to engage the underside 15 of the body seat ring 4. The point 14b initially engages the lower peripheral surface 15 of the body seat ring 4 and as the nut 9 is tightened down, the bridging or span member 14 is elevated gradually to a horizontal position so as to bear ultimately against the underside of the body seat ring 4 as shown in the full lines. Thus the bridging member 14 is intentionally made loosely pivotable in order that it may normally be suspended with its heavier end 14a lowermost, thus permitting it to be inserted in a diagonal or foreshortened position within the comparatively smaller circular opening 16 of the body seat ring. It follows that after the nut 9 has been pulled up sufficiently so as to insure a tight engagement between the lugs 3 and the slots 2 of the body seat ring sufficiently to insure against disengagement, a lever such as a pipe wrench, may be applied to the exterior of the pipe 1 at a point beyond the casing limits (not shown) with the assurance that maximum effort can be applied without the tool slipping from the body seat ring with which it has positive attachment. It is also readily apparent that such lever as a pipe wrench may be dispensed with in many instances, by the simple expedient of providing the crosshead 8 lying within the slot 8a with such length extending beyond the diameter of the tubing 1 that the required leverage may be applied thereto independently by gripping the overhanging extended portions of the crosshead 8.

The end suspending piece 10 may be attached to the stem 12 by means of threads (as shown in dotted lines) or by a pin, or may even be made integral with the stem 12. However, this is a matter of mere selection, depending upon size and service for which the tool is intended.

It is obvious that this invention is capable of many varieties of form, and I therefore desire to be limited only to the extent of the appended claim.

I claim:

A tool for removing threaded valve seat rings and the like comprising a tubular member superposed upon said valve seat ring and provided at one end with peripheral interlocking means for engaging complementary means on the face of the said valve seat ring, the said tubular member having an external diameter substantially equal to or greater than the diameter of the threads of the said seat ring, a rod within said tubular member and positioned axially parallel therewith of greater length than the said tubular member, the said rod having suspended at its lower end pivotal spanning means suitable for contact with the lower peripheral portion of said seat ring, a holder for said spanning means adjustably connected to said rod, a crosshead engaging the upper end of said tubular member, threaded means on said rod cooperating with said crosshead for maintaining said tubular member in relatively non-rotatable peripheral engagement with the said seat ring for removal of the latter upon torsional application of a pipe wrench or similar tool to the said tubular member.

WILLIAM P. KLIMENT.